UNITED STATES PATENT OFFICE.

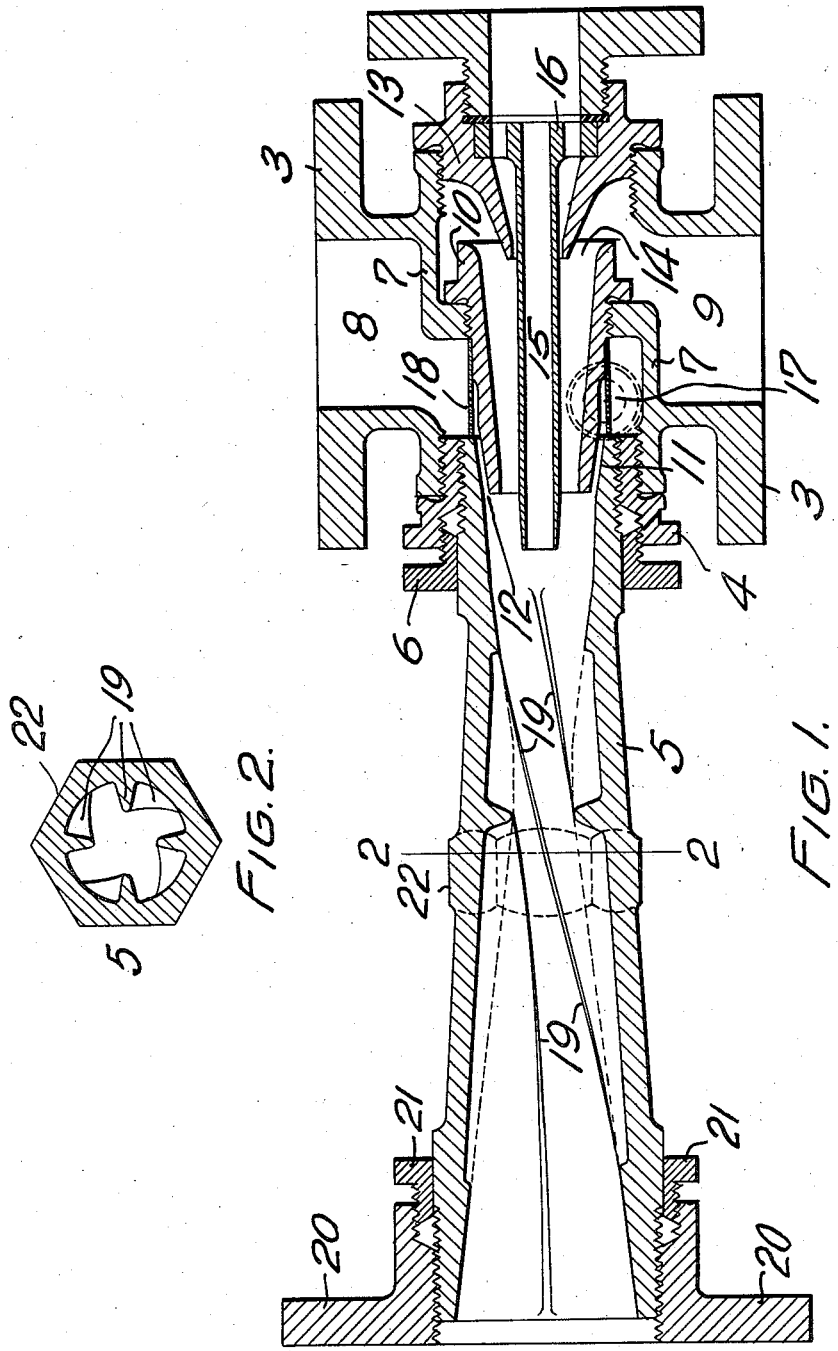

JUDSON A. DE CEW, OF MONTREAL, QUEBEC, CANADA.

INJECTOR.

1,149,554.   Specification of Letters Patent.   Patented Aug. 10, 1915.

Application filed July 28, 1913. Serial No. 781,578.

*To all whom it may concern:*

Be it known that I, JUDSON A. DE CEW, a subject of the King of Great Britain, and resident of the city of Montreal, in the Province of Quebec and Dominion of Canada, have invented certain new and useful Improvements in Injectors, of which the following is a full, clear, and exact description.

This invention relates to improvements in emulsifying injectors, and the object is to provide means for mixing one or more liquids with steam.

A further object is to provide a device of this character in which the cross sectional area of one of the liquid passages can be adjusted during operation, to alter the percentage of the liquid introduced through this passage.

A still further object is to impart a swirling movement to the liquids immediately after they are brought together, so as to effect more intimate and rapid mixing or emulsifying.

In order to attain these objects, I provide a casing containing two or more liquid passages, at first radially arranged and then turning so as to assume concentric relation. A nozzle is provided to inject steam in such a manner that both liquids are drawn into a rifled mixing tube and mingled with one another and with the steam. Means may also be provided for mixing steam with one or both of the liquids prior to their mingling.

In the drawings which illustrate the invention:—Figure 1 is a longitudinal sectional view of the device. Fig. 2 is a cross sectional view on the line 2—2, Fig. 1.

Referring more particularly to the drawings, 3 designates as a whole a casing which is of substantially usual construction. An internally threaded gland nut 4 is screwed into one end of this casing and carries a mixing tube 5 screw-threaded thereto. A gland nut 6 is provided on the gland to form a stuffing-box for the purpose of preventing leakage past the threads. Within the casing 3 is a diaphragm 7 separating the radial liquid inlets 8 and 9. Screwed into this diaphragm is a hollow internally and externally tapering nozzle 10, which projects a short distance into the tapered rear end 11 of the mixing tube, but is spaced from the inner wall thereof, so as to form an annular passage 12 communicating with the liquid inlet 8. The back end of the nozzle 10 communicates with the liquid inlet 9, so that at the termination, these passages are in concentric relation. An internally and externally tapered steam supply nozzle 13 is screwed into the rear end of the casing, and projects a short distance into the enlarged rear end of the nozzle 10, so as to form an annular passage 14 through which the liquid is drawn from the entrance 9 into the nozzle 10. The steam nozzle carries a small central pipe 15 which projects entirely through and a short distance beyond the nozzle 10, as clearly shown in the drawings. The rear end of this pipe is supported by a spider or perforated plate 16, which permits the steam to flow out through the nozzle 13. A clean-out aperture 17 may be provided for the casing, and at approximately the same point an annular strainer 18 may be provided to prevent impurities entering and clogging the passage 12.

The interior of the mixing tube 5, which tapers from the rear end to a short distance beyond the steam pipe 15, and from the front end more rapidly toward the same point, is provided on its interior with helical blades 19 which form rifling, and serve to impart a rotary or swirling motion to the liquid. This rifling preferably starts a short distance to the rear of the point of least diameter of the mixing tube and extends any suitable distance toward the front end. The front end of the tube is screwed into an attaching flange 20, and is in addition provided with a gland nut 21 which prevents leakage at the screw threads. At any suitable point, the mixing tube may be provided with an external polygonal portion 22 for the reception of a wrench.

The operation of the device is as follows:—Steam blows through the nozzle 13 and through the pipe 15 at high velocity, and thus operates to draw in water through the opening 9 and resin size or other liquid which it is desired to mix with the water through the opening 8. Steam issuing from the nozzle 13 carries the water in through the nozzle 10, and in addition to carrying breaks up the water and heats the same to a suitable temperature for mixing with the other liquid. The rush of steam through the nozzle 10 and pipe 14 draws in the resin size through the narrow annular passage 12, so that it mingles with the steam and water issuing from the nozzle 10. The two liquids are thus brought into intimate contact and in a substantially finely-divided condition, so that an action very nearly approximating perfect emulsification takes place. The additional supply of steam coming through the pipe 15 blows into this mixture and completes the action. The final supply of steam is greatly aided in its action by the rifling 18, which in effect gives the liquid mixture a movement across the path of the steam. The amount of resin size may be regulated by turning the mixing tube so that its threaded rear end connection produces longitudinal movement, which will result in decreasing or increasing the area of the annular passage 12.

Having thus described my invention, what I claim is:—

1. In an injector for mixing liquids by means of steam, a casing, concentric liquid passages therein, a steam nozzle projecting into the inner of said passages whereby steam is mixed with one of the liquids before the two liquids meet, a mixing tube attached to the casing, elongated helical ribs on the interior of said tube, and a steam pipe projecting into said mixing tube arranged to deliver steam to said liquids after their mixing.

2. In an injector for mixing liquids by means of steam, a casing having two liquid passages, a mixing tube communicating with one of said passages, helical blades formed on the interior of said mixing tube and extending from end to end thereof, a tapering nozzle communicating with the other passage projecting into said mixing tube, a steam nozzle projecting into said liquid nozzle, and a steam pipe passing through said steam and liquid nozzles and projecting into the mixing tube, and arranged to discharge a jet of steam into the mixed liquids adapted to coöperate with the rifling to produce more intimate mixing, substantially as described.

In witness whereof, I have hereunto set my hand, in the presence of two witnesses.

JUDSON A. DE CEW.

Witnesses:
S. R. W. ALLEN,
G. M. MORELAND.